United States Patent [19]

Sheppard

[11] 4,257,313

[45] Mar. 24, 1981

[54] POWER STEERING PISTON AND CYLINDER COMBINATION WITH PLASTIC WEAR SURFACES

[76] Inventor: Peter H. Sheppard, 101 Philadelphia St., Hanover, Pa. 17331

[21] Appl. No.: 34,562

[22] Filed: Apr. 30, 1979

Related U.S. Application Data

[63] Continuation-in-part of Ser. No. 843,976, Oct. 20, 1977, abandoned.

[51] Int. Cl.³ ............... F15B 13/04; F01B 9/00; F01B 31/00; F16J 9/00
[52] U.S. Cl. ............................ 91/422; 92/127; 92/136; 92/248
[58] Field of Search ............. 92/255, 136, 212, 126, 92/248, 249, 168, 184, 127; 91/422

[56] References Cited

U.S. PATENT DOCUMENTS

| | | | |
|---|---|---|---|
| 3,092,083 | 6/1963 | Sheppard | 92/136 |
| 3,125,004 | 3/1964 | White | 92/155 |
| 3,155,015 | 11/1964 | Genz | 92/249 |
| 3,168,301 | 2/1965 | Allinquant | 92/155 |
| 3,343,460 | 9/1967 | Jones | 92/168 |
| 3,399,494 | 9/1968 | Hendrickson | 92/184 |
| 3,442,183 | 5/1969 | Howe et al. | 92/184 |
| 3,776,100 | 12/1973 | Yeh | 92/136 |
| 3,983,793 | 10/1976 | Beardmore | 92/212 |

FOREIGN PATENT DOCUMENTS 877529   9/1961   United Kingdom .............. 92/126

*Primary Examiner*—Paul E. Maslousky
*Attorney, Agent, or Firm*—Lowe, King, Price & Becker

[57] ABSTRACT

Plastic wear strips are provided on a power steering piston or cylinder to improve the efficiency of translation movement of the piston in the cylinder during operation. The plastic surface of the strip, which is preferably on the piston, minimizes wear by providing a differential molecular structure at the interface between the cylinder wall and the surface of the piston since the cylinder wall is machined metal. The strips are positioned adjacent the ends of the rack where wear, caused by the load from the pressurized hydraulic fluid on the opposite side of the piston adjacent the inlet slot, is potentially the greatest. Plastic filling is provided in preferred arcuate grooves around the piston to form the wear strips. A single strip, or alternatively a group of independent strips, can be used and both serve to interrupt the surface of the piston so that molecular interaction of the two surfaces, or "slip-stick" effect, is effectively prevented. The wear strips extend through a 60° arc on both sides of the center line of the piston and the plastic is cured epoxy resin fixed in the grooves. Homogeneously dispersed metal chips stabilize the plastic. In a second embodiment, the plastic strips float within the grooves on a layer of hydraulic fluid provided by longitudinal channels formed on the surface of the piston. The method of preparing or manufacturing the piston and cylinder includes filling the grooves with the plastic and finishing the outer face within the mold and by milling the surface.

12 Claims, 9 Drawing Figures

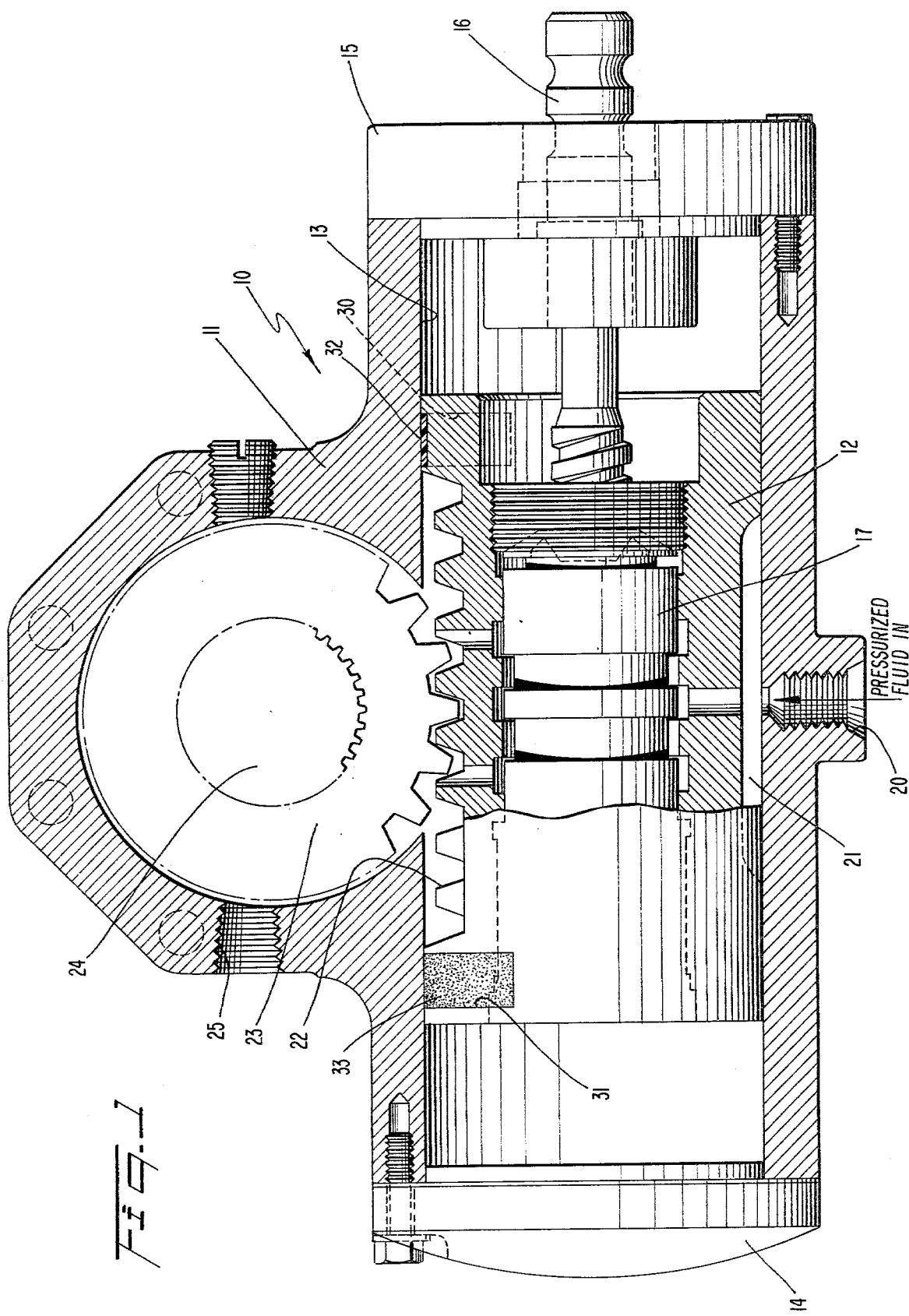

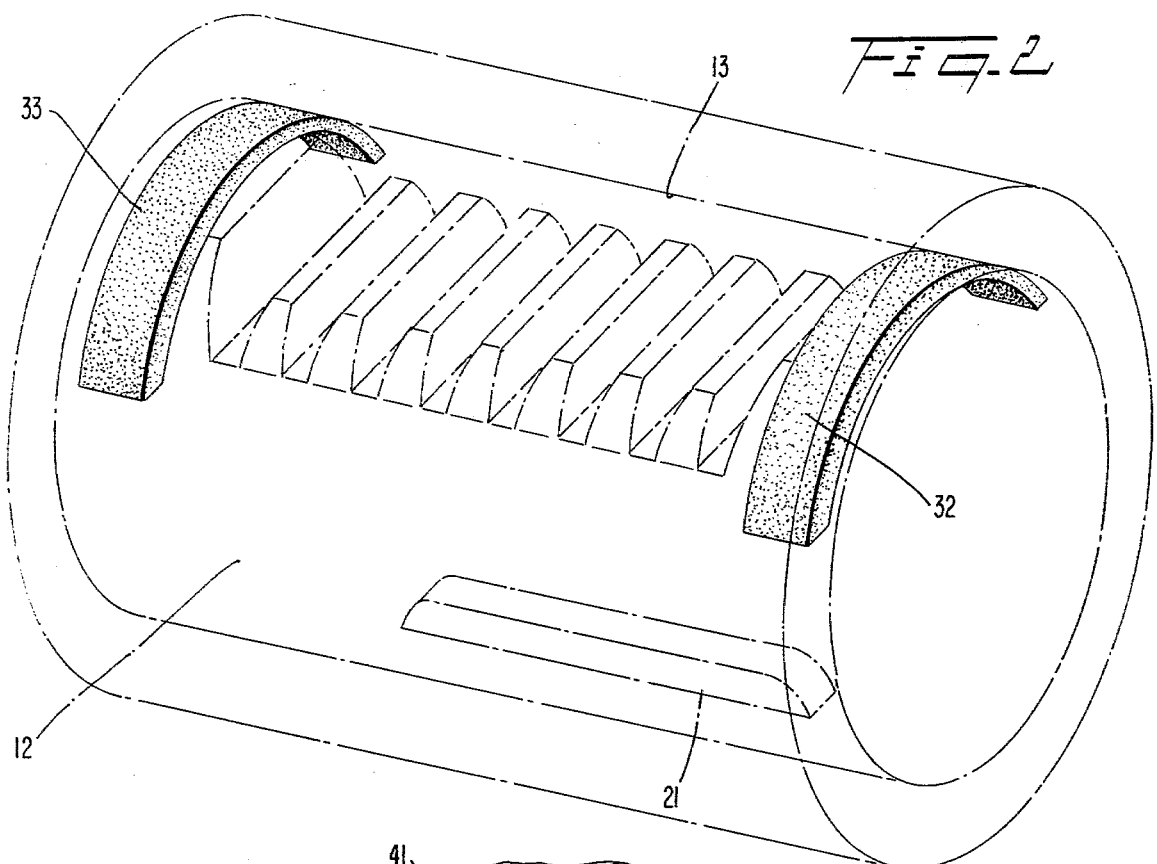
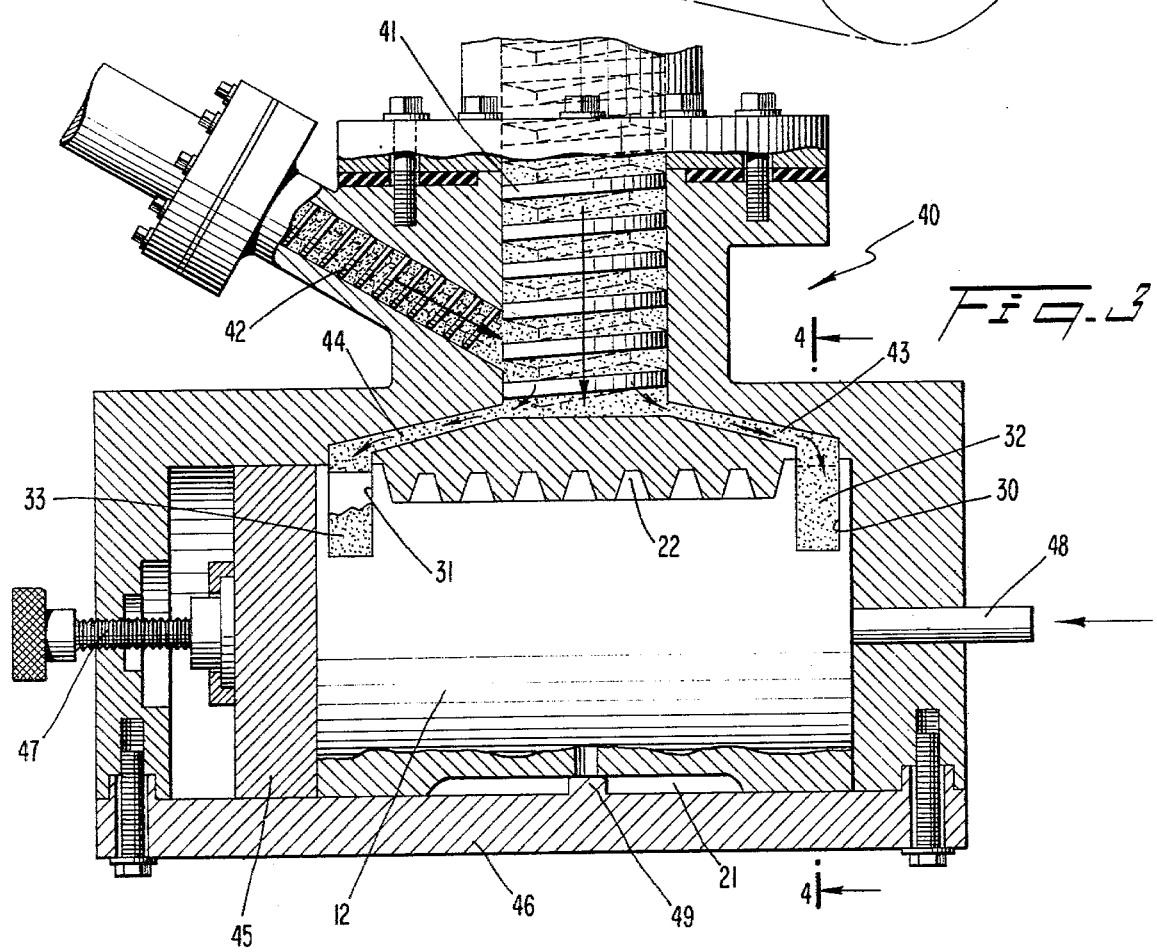

POWER STEERING PISTON AND CYLINDER COMBINATION WITH PLASTIC WEAR SURFACES

CROSS REFERENCE TO RELATED APPLICATION

This application is a continuation-in-part of my application Ser. No. 843,976, filed Oct. 20, 1977, now abandoned.

FIELD OF THE INVENTION

The present invention relates to power steering gears, and more particularly, to a new, improved piston with plastic wear strips.

BACKGROUND OF THE INVENTION

Integral power steering is today accepted as the standard in the industry for steering wheeled vehicles. In an integral power steering unit, a piston operates by sliding within a cylindrical with a rack on the piston operating an output gear and pitman arm to shift the steering linkage as required.

One of the most successful power steering gears and design for a piston for the gear is described and claimed in the R. H. Sheppard U.S. Pat. No. 3,092,083, entitled "Piston For Power Steering System." This highly successful basic design has the highest efficiency and reliability, coupled with the lowest manufacturing cost in the industry today. It is particularly adapted to large vehicles, where relatively large steering forces are required.

In the Sheppard-type integral power steering gear unit, the pressurized hydraulic fluid is fed into the unit through an inlet slot on the side of the piston opposite from the output rack that engages the output gear. Under dynamic conditions of the unit, the hydraulic pressure acting on the inlet slot side of the piston offsets to some degree the countering force of the rack and pinion engagement. This gives the greatest efficiency, since with the piston at least partially balanced within the cylinder, minimum frictional forces are at work attempting to retard the movement of the piston.

Over the years, several proposals have been made for reducing friction further, especially in the instance where the piston is initially being moved from a static position. In this mode, of course static friction, increased by the heavy load from the hydraulic pressure adjacent the inlet slot, must be overcome in order to allow the piston to translate and move the steering linkage in the appropriate direction. Low friction condition in this mode of operation is important since the responsiveness of the gear, that is the ability of the piston to "break loose" with minimum force on the steering wheel, is a primary criterion governing the efficiency of a steering gear.

In the area of responsiveness, the Sheppard gears have excelled over the years. Continuous improvements have been made prior to my invention. For example, in U.S. Pat. No. 4,088,063 of R. H. Sheppard entitled "Power Steering Gear with Short Piston and Fluid Bearings," and which is subject along with the '083 patent to an exclusive license to the same company as is exclusively licensed under the present invention, one approach is to provide lubricating grooves along the piston adjacent these areas of potentially greatest friction or wear, that is around the output rack. This design has greatly enhanced the responsiveness of steering gears, since the direction of lubrication of these critical areas allows less static friction, and consequently less wear on the cylinder. This concept has been adopted in the newest generation of gears and has attained wide acceptance as a major step forward in the field. This approach of providing fluidized bearings on the surface of the piston, has allowed trucks previously unsteerable to be steered with relatively small steering gears, and in some instances even at comparatively reduced hydraulic pressures.

I have discovered however that there is one drawback to this design. By providing the lubrication grooves adjacent the output rack, along the sides of the piston, and adjacent the ends, there is some increased leakage in the steering gear unit, particularly under heavy loads where the pressure of the pump is increased to its highest levels. This leakage is caused by the fact that the oil in the grooves is able to squeeze out between the piston and the cylinder into the low pressure side of the steering gear unit. This means that there is under some circumstances, such as a truck in heavy mud or severe parking maneuvers, some loss of pressure that could otherwise be used to advantage to move the piston. Also, there is increased flow from the pump required during all modes of operation as some oil inevitably squeezes out between the piston and the cylinder wall to the low pressure side.

OBJECTIVES OF THE INVENTION

Thus, it is one object of my invention, and a principal object, to provide plastic wear surfaces in a piston and cylinder combination of a power steering gear producing a viable alternative to hydraulic pressure grooves and other concepts in reducing friction.

It is another object of the present invention to provide a piston utilizing plastic wear strips that prevent "slip-stick" effect, that is, a piston that assures low molecular interaction with the cylinder at the sliding interface.

It is a further object of the present invention to provide plastic wear strips which float on a layer of pressurized hydraulic fluid of further reduce static friction between a piston and cylinder of a power steering gear.

It is another object of the present invention to provide such plastic wear surfaces in a power steering gear to give improved efficiency to the operation of the gear and extend the life of the gear.

It is still another object of the present invention to provide a piston for a power steering gear unit wherein cured epoxy resin wear strips including stabilizing chips of metal, are utilized to provide the improved efficiency of translation in the cylinder.

It is still another object of the present invention to provide a related method of manufacturing of a power steering gear wherein epoxy resin wear strips are injection molded and finished in a highly efficient way.

BRIEF DESCRIPTION OF THE INVENTION

A new, improved piston for operating in the cylinder of a power steering gear unit is provided wherein plastic wear strips are provided at each each of the piston. The strips are preferably localized in the area of greatest potential wear caused by molecular interaction adjacent the ends of the power or output rack. The wear strips interrupt the metallic-to-metallic interface between the outer surface of the piston and the inner surface of the cylinder so as to thus prevent the "slip-stick" effect; i.e., the effect wherein the surfaces become so intimate that the molecules of the piston and cylinder tend to interlock, materially increasing wear as the metal is literally torn by one surface from the other. The plastic and metal interface of the steering gear of my invention has sufficiently different molecular structure that there is virtually no tendency to interchange molecules even after extended operation of the steering gear unit. While the preferred embodiment disclosed herein utilized single wear strips on the piston adjacent the ends, it is within the purview of one aspect of my invention to provide multiple wear strips instead.

The plastic wear strips are provided by forming recesses in the piston and filling the recesses with epoxy resin that is then simply air cured to form the bearing surface. The epoxy firmly adheres to the recess, which preferably takes the form of a groove around an approximately 60° arc on both sides of the piston centerline between the end of the rack and the end of the piston at each end. This location is preferred since this is the location of greatest potential wear. This is so since the area of the piston removed to provide the rack of the piston reduces the area of support for the piston, thus leaving the ends to bear a proportionally greater load. Since the hydraulic fluid inlet slot is directly opposite the rack, the forces, particularly at the beginning and end of a steering cycle, tend to press the piston against the side of the cylinder with even greater force.

In one embodiment, the wear surfaces are provided by a single strip substantially filling the area between the end of the rack and the end of the piston. Alternatively, the wear strip can comprise a group of independent strips adjacent each end with the strips also filling the area mentioned. By making a plurality of strips, the piston surface has additional plastic-metal interruptions providing lower molecular interaction under some conditions. Also, the strips of metal left between the plastic strips serve to reinforce this wear surface area.

Preferably, the plastic filling comprises epoxy resin reacted chemically with a polyamide resin. The polyamide acts as a catalyst or curing agent and when mixed with the epoxy resin produces a tough and chemical resistant coating. The filling is resistant to heat well within the range required for power steering gear operation, i.e., the plastic is not adversely affected up to temperatures of 250° F. The cured epoxy resin has minimum tendency to creep, that is shift within the groove, especially in the multi-strip embodiment, excellent resistance to expansion and contraction within the operative temperature range, and can be easily machined, such as by milling.

To further stabilize and strengthen the epoxy, homogeneously dispersed metal chips selected from the group consisting of ferrous metals, including cast iron and steel chips are interspersed in the filling. Approximately one-third by volume of the filling is chips and these chips are approximately 25-30 mesh size. The chips also add body to the plastic to provide greater ease of handling during the filling of the grooves during manufacture, and add resistance to creep of the strip.

The method of preparing the power steering piston and cylinder is unique in that recesses are provided on one of the metallic bodies, the recesses are filled with plastic and the plastic filling is finished to provide the wear surface. The wear surface provided by my method is so efficient that previously utilized lubrication grooves may be completely omitted along the rack side of the piston. Preferably, the filling step is carried out by injection molding with the epoxy and the catalyst being mixed directly in the injection molding head. In order to smooth the outer face of the wear strip, the piston may be shifted within the mold prior to removal, and then milled, if desired.

In another embodiment, friction between the cylinder and piston is further reduced by providing wear strips which float within each recess of the piston on a thin layer of hydraulic fluid fed under pressure along one or more longitudinal channels formed on the piston surface.

Still other objects and advantages of the present invention will become readily apparent to those skilled in this art from the following detailed description, wherein I have shown and described only the preferred embodiments of the invention, simply by way of illustration of the best modes contemplated by me of carrying out my invention. As will be realized, the invention is capable of other and different embodiments, and its several details are capable of modification in various, obvious respects, all without departing from the invention. Accordingly, the drawings and description are to be regarded as illustrative in nature, and not as restrictive.

BRIEF DESCRIPTION OF THE DRAWINGS

FIG. 1 is a side view in cross section showing the piston within the cylinder of the integral power steering gear unit and with single, relatively wide wear strips at the ends adjacent the output rack;

FIG. 2 is a perspective view of the piston of FIG. 1 positioned within a phantom cylinder showing the position of the plastic wear strips at the ends of the piston;

FIG. 3 is a cross-sectional view of an injection molding head that may be utilized in carrying out the method of manufacturing the piston with the plastic wear strips;

DETAILED DESCRIPTION OF THE PREFERRED EMBODIMENTS

Figure 4:
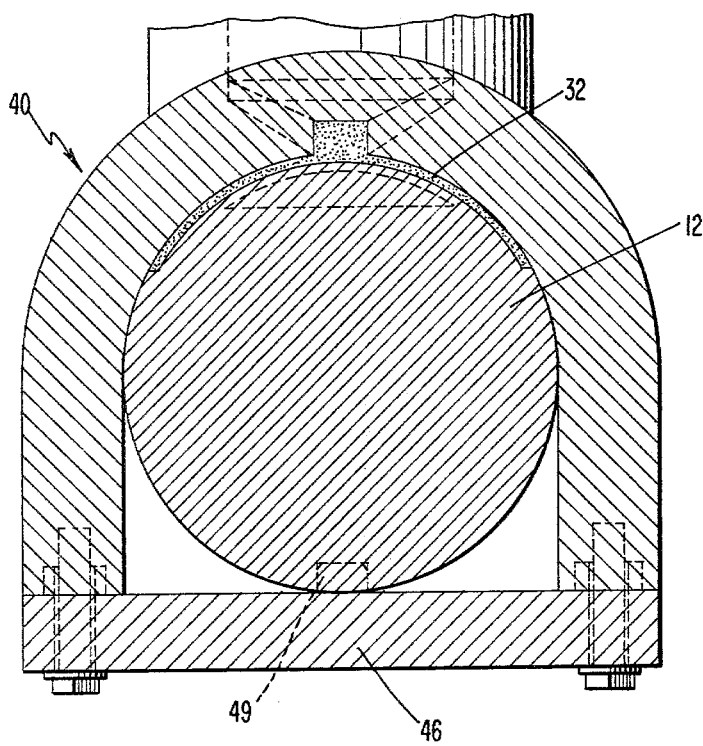
FIG. 4 is an end cross-sectional view taken along line 4—4 of FIG. 3 showing the filling of one groove with plastic.

An integral power steering gear unit 10, shown in FIG. 1 of the drawings, includes a housing 11 of cast iron, and a piston 12 of hardened steel within a cylinder 13. A cylinder end cap 14 closes one end and a bearing end cap 15 closes the other end of the cylinder 13. Through the bearing end cap 15 is supported an input shaft 16 that is connected through a steering shaft to the steering wheel of the vehicle. The input shaft 16 operates a valve 17 within the piston 12 in order to distribute pressurized hydraulic fluid to the proper end of the cylinder 13. This basic operation of the power steering gear is well known and reference can be made to the previous patents to R. H. Sheppard, U.S. Pat. Nos.

3,092,083 and 4,088,063, referred to above for a more detailed description of the basic operation.

The pressurized fluid from the hydraulic pump (not shown) enters through port 20 on one side of the cylinder 13 and is distributed as the piston translates along the cylinder by a distributing inlet slot 21. On the opposite side of the piston 12 is provided an output or power rack 22 that in turn engages output pinion or gear 23 of the power steering gear unit 10. As is well known, output shaft 24 is connected to a pitman arm (not shown) to operate the steering linkage of the vehicle. Low pressure or return port 25 returns the fluid to the hydraulic pump.

In order to better understand my invention, a short explanation of the forces involved in the power steering gear unit 10 is in order. As the pressurized fluid enters the gear 10 through the port 20, the distributing slot 21 is filled. This high pressure fluid is trapped with (and, through some leakage, around) the slot and is fed to the valve 17 where it is distributed to the appropriate end of the piston 12 in order to move the piston and in turn the output gear and shaft 23, 24. This high pressure fluid, up to 1700-2000 psi, acting in the slot 21 forces the piston 12 toward the output gear 23 causing the piston on that side to be pressed against the cylinder wall 13 with greater force.

Under the dynamic condition when the piston is moving to turn the output gear 23, the force of the gear 23 and the rack 22 tending to separate tends to balance th fluid pressure within and around the slot 21. It is during the period of break-loose of the piston from a static condition that the force of the piston against the cylinder wall 13 is greatest, and the greatest potential for "slip-stick" effect or deleterious molecular interaction takes place.

In accordance with one embodiment of my invention, I have taken into account these forces, and instead of attempting to improve on lubrication and/or other concepts taught in the power steering art in the past, I have provided instead plastic wear surfaces adjacent the ends of the piston 12 particularly adapted to counter this "slip-stick" effect. Specifically, I have provided recesses 30, 31 at the opposite ends of the body on the piston 12, and within these recesses, preferably arcuate grooves, I have a plastic filling forming wear strips 32, 33, respectively. The wear strips 32, 33 are positioned adjacent the ends of the output rack 22 so as to be positioned in the area of greatest need. In other words, because of the presence of the rack 22, the bearing support within the cylinder 13 is reduced along the side of the piston 12 and, at the same time the hydraulic pressure adjacent the slot 21 is greatest pushing the piston 12 toward this side, and therefore the intensity of the pressure at the limited areas adjacent the ends of the piston 12 is greatly increased. As shown, the wear strips 32, 33 are of a width to substantially fill the areas between the ends of the rack 22 and the ends of the piston 12.

Because this embodiment of my invention does not rely on the provision of lubricating hydraulic oil, there is no increased leakage potential, and thus the capacity of the pump that is necessary is kept at a maximum. All of the oil from the pump is available for useful work in translating the piston 12 in response to the steering demand.

The plastic fillings forming the wear strips 32, 33 are firmly fixed or adhered in the recesses. The strips are thus not subject to flexure stresses, such as are piston rings, thus virtually eliminating misfit and breakage, that are potential problems, particularly during manufacturing. I have also found it necessary only to provide the wear strips around substantially a 60° arc on both sides of the piston centerline in the locations indicated, as can best be viewed in FIG. 2. In FIG. 2, a phantom cylinder 13 is shown in order to clearly illustrate the manner in which the wear strips serve to support the piston 12 adjacent the ends in this limited area.

After consideration of several different plastics and a test program, it has been discovered that the preferred plastic is an epoxy resin reacted chemically with a polyamide resin. Generically, epoxy resin is produced by reaction of epichlorohydrin with bisphenol and the polyamide resin is a condensation product of polyamides and dibasic acids. The polyamide acts as the catalyst or curing agent and when mixed with the epoxy resin the plastic filling produced exhibits properties that are ideal for the objectives of my invention. The plastic filling is tough and chemically resistant to hydraulic fluids. It produces a face which has a molecular structure different from the metal, and thus not subject to molecular interlock that would otherwise produce the "slip-stick" effect. The epoxy is not adversely affected by the operating temperatures of the gear, which are below 250° F., and has been found not to be subject to creep, squeezing or growing out of the recess in which the filling is placed. The epoxy has affinity for the properly prepared bottom of the groove so that it is firmly fixed and becomes an integral part of the piston structure.

With the epoxy, the grooves 30, 31 may be relatively shallow, the preferred depth being approximately 3/32 to 1/16 inch deep. Thus, the amount of epoxy material required is minimized and the strength of the steel piston body is not adversely affected.

I further prefer to provide a homogeneous dispersion of metal chips in the epoxy in order to stabilize the plastic. This is particularly helpful during the manufacturing step of forming the wear strips 32, 33. The interspersed chips help to strengthen the wear strips and strengthen the strips against compression, which is an important factor in preventing creep or squeezing of the plastic filling toward the sides or ends of the grooves. It should be emphasized that because the plastic filling is preferably within a closed recess or groove, the sides and ends of the groove serve as shoulders against which the plastic and the metal chips can act to prevent the deleterious creep from occurring.

The metal chips are preferably selected from the group consisting of ferrous metals including cast iron and steel chips. The most favorable mixture includes one-third by volume of chips in the plastic filling and chips approximately 25-30 mesh size. The chips that are exposed along the outer peripheral face of the strips 32, 33, provide tiny islands that serve to break up the solid plastic face. From tests, this face of plastic and interspersed metal chips seems to be very highly effective in preventing a perfect match at the interface between the piston and the cylinder, thus assuring that molecular structure intermix and tearing of the metal does not occur. These tiny islands within the peripheral face actually appear to cause the development of a smoother, more polished surface along the cylinder wall so that the piston and cylinder combination (12, 13) of my invention gains in efficiency by reduced friction as it is used. This gain occurs over the life of the gear while maintaining the synergistic result of preventing the perfectly matched, intimate contact that results in welding of the materials together by "slip-stick" effect and tearing and wearing at the interface.

The selection of epoxy and metallic chip mixture has other clear advantages. This is a relatively inexpensive composition, is stable and thus easy to handle, and is air-setting under ambient conditions.

Another advantageous feature connected with my invention is that the power steering piston 12 can be prepared in a low cost fashion for greater manufacturing efficiencies. The metal bodies of the piston and housing 11 forming the cylinder 13 are first formed. Next, accurately formed arcuate grooves are cut in the piston. These grooves 30, 31 are easily machined during the manufacturing process of the body of the piston 12. After cleaning and preparation of the grooves 30, 31 the grooves are simply filled with the plastic, and after curing, the outer face of the plastic filling is finished to a smoothness comparable to the smoothness of the remainder of the piston 12. A high degree of finishing is not necessary. Actually, as pointed out above, as the piston works in during operation of the power steering gear unit 10 the strips 32, 33 become an even more effective wear surface as the surface of the cylinder 13 is polished at the interface.

Another salient advantage of the method aspect of my invention arises from utilizing a plastic, such as cured epoxy, for the bearing strips. This advantage is that the epoxy can be filled in the recesses by injection molding. An injection molding head 40 includes a feed screw 41 for feeding the epoxy resin with feed screw 42 being operated concurrently to feed and mix the curing agent. As the screw 41 rotates, the two resins are mixed and pass through diverging passages 43, 44 and into the arcuate grooves 30, 31.

The head 40 includes a cavity in which the piston 12 is held by an adjustable clamp 45 at one end. A cover 46 (see also FIG. 4) locks the piston 12 in position while the resin is fed through the passages 43, 44 to he grooves 30, 31. Once the grooves have been filled, the auger screws 41, 42 may be reversed a slight amount relieving the positive pressure within the passages 43, 44. The adjustable clamp 45 is retracted by operation of the screw 47 and shift pin 48 at the opposite end of the mold is operated to force the piston 12 to the left to cause a smoothing of the upper surface of the epoxy and metal chip mixture.

The integral pin 49 on the cap 46 rides in the inlet slot 21 in order to properly position the piston and guide it during the finishing transition step involving shifting of the piston. The interior of the mold can be suitably treated with epoxy solvent to prevent sticking to the mold, as is known in the art.

Figure 5:
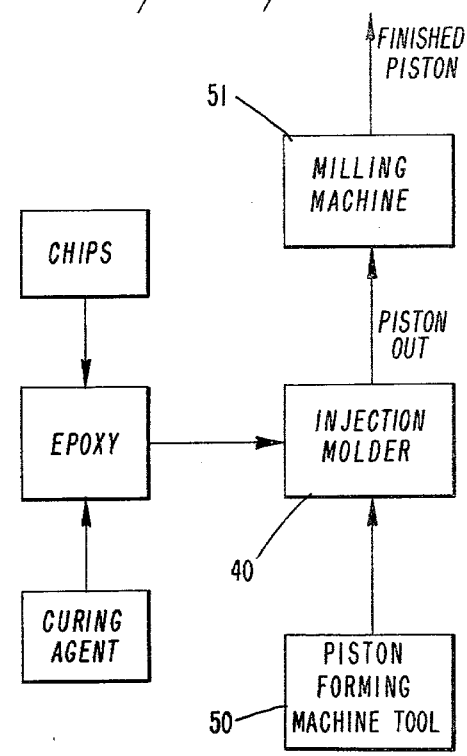
FIG. 5 is a flow chart showing the method of manufacturing the piston in accordance with the present invention.

In FIG. 5, there is shown a flow chart setting forth together all of the steps of a method for preparing or manufacturing my power steering piston. The body of the piston 12 is first formed by machining on a conventional machine tool 50 and is placed in the cavity of the molding machine and locked in position by the cap 46. The metallic chips are mixed with the epoxy and/or curing agent and fed to the injection molding head 40 where the mixture is injected into the grooves 30, 31 by the passages 43, 44. The piston is then removed after initially shifting the piston by the pin 48 to smooth the surface, and then finished on a suitable milling machine 51. This represents a minimum number of steps and the greatest efficiency in manufacturing for this type of piston. However, it is to be understood that in accordance with the broadest aspect of my invention, variations, such as simply filling the epoxy by hand using a suitable knife edge for smoothing, can be used, if desired.

Figure 6:
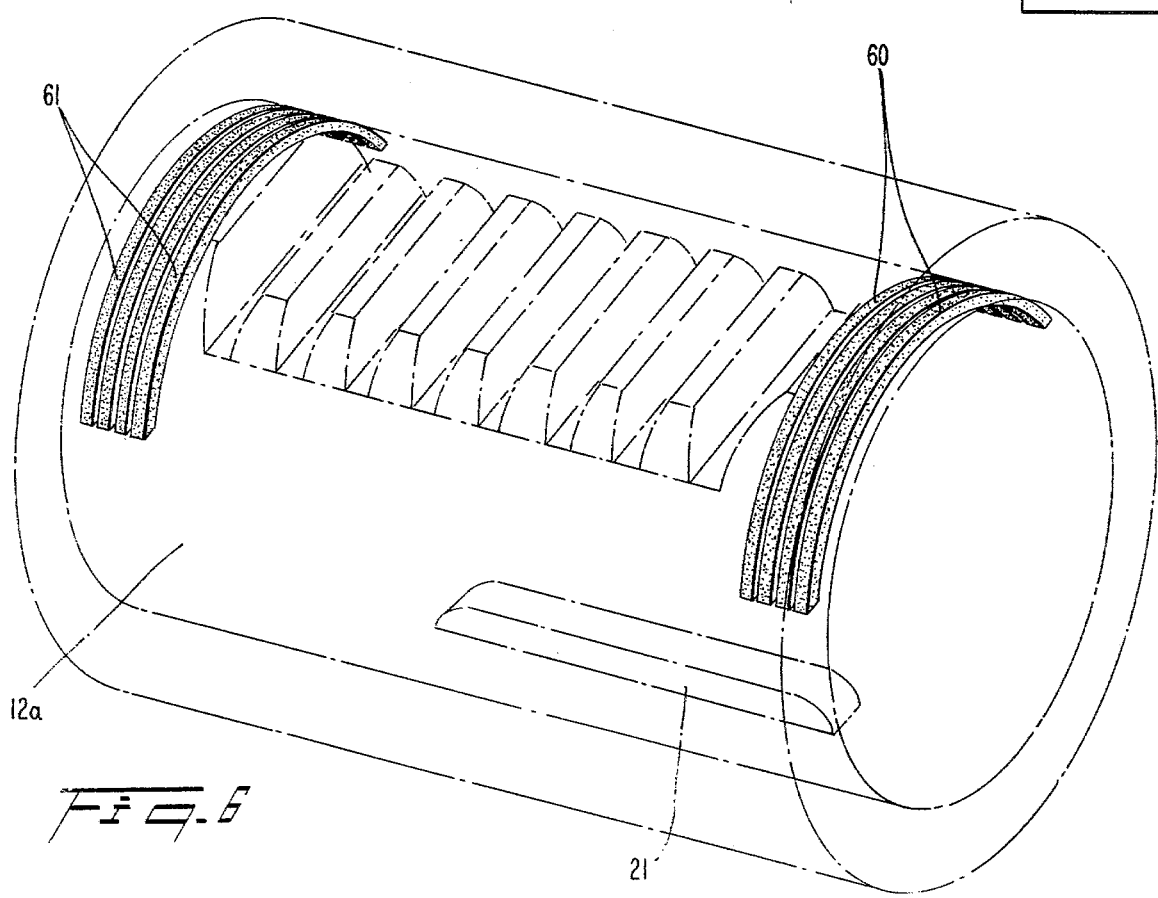
FIG. 6 is a perspective view of another embodiment of the improved piston within a phantom cylinder, the piston employing a group of wear strips at each end.

The piston 12a shown in perspective in FIG. 6, is one alternative embodiment in which the bearing means comprises a group of independent strips 60, 61 adjacent the ends of the piston 12a. These bearing strips may be molded, as just described, and are positioned essentially in the same area as previously described with respect to bearing strips 32, 33. By providing multiple strips, the epoxy material utilized can be minimized and also this provides additional interruption of the surface, thereby further minimizing under some conditions the tendency for the materials to weld together by "slip-stick" effect. Also, the narrowing of the strips 60, 61 further reduce the chance for creep or growing of the plastic because of the multiple shoulders tending to hold the plastic in position. The steel ribs left between the wear strips 60, 61 add to the overall strength of the wear area.

Figure 7:
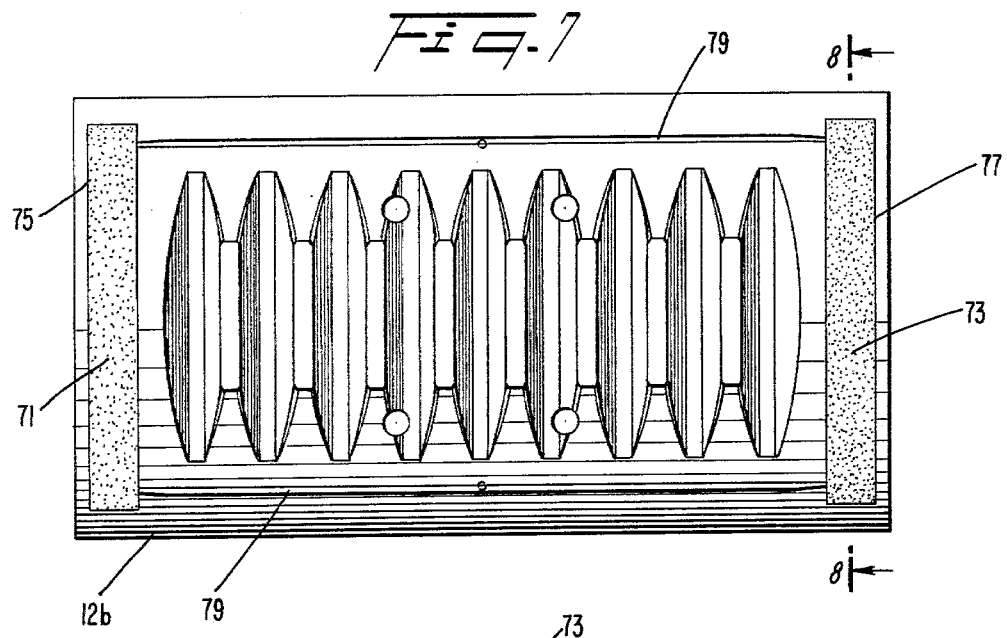
FIG. 7 is a side view of yet another embodiment of the improved piston, the piston having a pair of wear strips floating on a thin layer of hydraulic fluid supplied under pressure.
Figure 8:
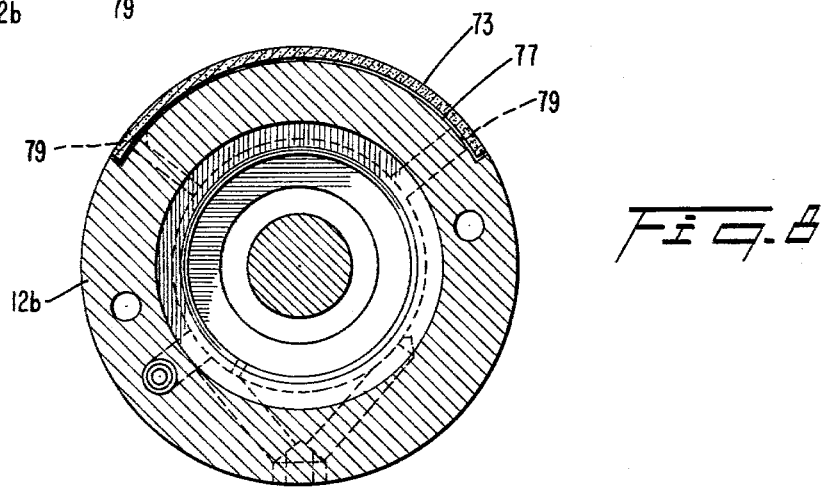
FIG. 8 is a cross-section of the improved piston taken along line 808 of FIG. 7.
Figure 9:
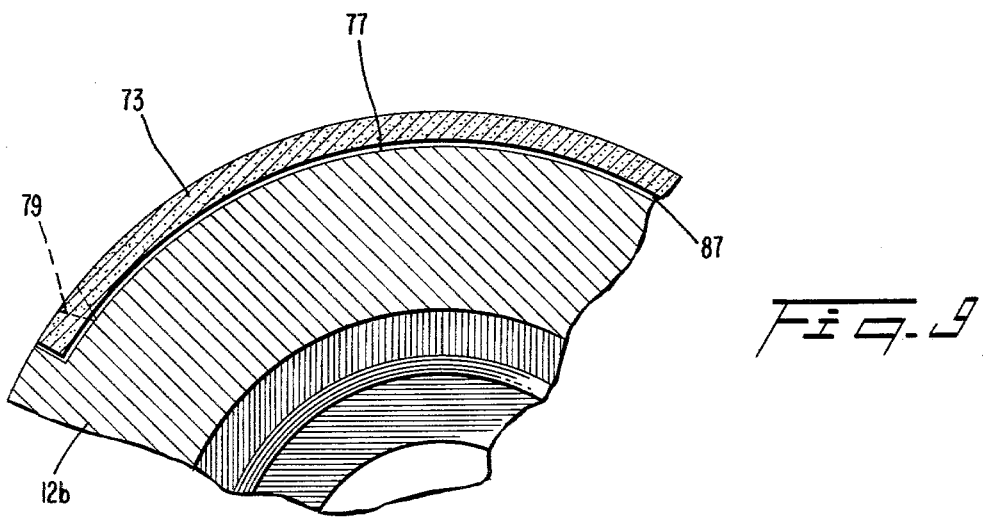
FIG. 9 is a magnified detail view of the piston and floating wear strip interface of FIG. 8.

The piston 12b shown in FIGS. 7, 8 and 9 is another alternative embodiment in which the bearing means comprises a pair of wear strips 71 and 73 loosely disposed in recesses 75 and 77, respectively. One or more hydraulic fluid channels 79 are formed along the surface of piston 12b. The fluid is delivered under substantially equal pressure through fluid delivery passages communicating with the inlet slot 21 of the piston. The fluid, under pressure, is then delivered to channels 79 and into recesses or grooves 75 and 77 and forms a thin film 87 upon which wear strips 71 and 73 float. With the hydraulic pressure in the grooves 75, 77, the action of the floating wear strips 71, 73 is to counteract the pressure around the inlet slot 21. The two ends of the piston are balanced by the equal pressure as the force around the slot 21 is counteracted. The thickness of the wear strips 71, 73 is substantially the same as in the other embodiments, i.e., the strips are 3/32 to 1/16 inch thick. The film supporting the strips is thin (approximately 0.001 inch) and provides an advantageous cushioning effect for wear strips 71 and 73 which further reduces the friction between wear strips 71 and 73 and the piston and cylinder walls. The fluid layer 87 enables wear strips 71 and 73 to flex or deform slightly as the piston and cylinder wall interact during operation of the gear. The floating wear strips 71 and 73 act as seals for the recessess 75, 77 and fluid channels 79 at either end of piston 12b. As the wear strips move in the recesses, there is no sticking due to formation of a vacuum under the strips since a constant flow of pressurized fluid is provided. It will be recognized that an extremely thin lubricating film ring exists around the periphery between wear strips 71 and 73 and recesses 75 and 77 maintaining the freedom of movement between these parts. The wear strips 71, 73 include the dispersed metal chips, as described with respect to the above embodiments.

In summary, the first embodiment of my invention provides for the first time a piston 12, 12a for a power steering gear 10 that does not require special lubricating grooves in order to give improved efficiency and greater power output and at the same time obviate the potential problem of "slip-stick" effect. I have provided plastic bearing strips 32, 33 or 60, 61 adjacent the end of the piston 12 that engage the inside surface of the cylinder 13 and minimize the effect of the increased force due to hydraulic fluid inlet slot 21 on the opposite side of the piston. Leakage within the power steering system is considerably reduced since there is no tendency for bleed from extra lubricating grooves on this side of the piston, as previously utilized. The method of preparing the piston includes the preferred concept of injection molding and finishing of the surface by shifting within the mold and machining the surface, such as by milling. In my alternative embodiment, I have further reduced the friction between a power steering piston 12b and cylinder by supporting bearing strips 71 and 73 on a thin layer of cushioning fluid 87. Even at high hydraulic fluid pressures and cushioning layer exerts a uniform force on strips 71 and 73 to keep the friction among the strips and piston and cylinder at a constant, low level.

In this disclosure, there is shown and described only the preferred embodiments of the invention, but as aforementioned, it is to be understood that the invention is capable of use in various other combinations and environments and is capable of changes or modifications within the scope of the inventive concept as expressed herein.

What is claimed is:

1. In a power steering gear having a reciprocating power piston in the cylinder, a valve operatively connected to said piston by distribution means to selectively distribute pressurized fluid to a first and second end of the piston within the cylinder for steering action, a steering input shaft operatively engaging the valve, inlet fluid pressure means on one side of said piston for supplying hydraulic fluid under operating pressure to said gear, and an output rack formed on the other side of said piston and engaging an output gear, the improvement comprising:

recess means formed on said piston, said recess means including an arcuate groove adjacent each end of said rack and extending around only on said other side of said piston, each groove being defined by a bottom, two sides and two ends; and plastic bearing strip means disposed and confined within and substantially filling each arcuate groove, the outer peripheral face of said plastic bearing means forming a low molecular bearing surface at the sliding interface, passage means for conveying hydraulic fluid to said grooves to provide a layer of hydraulic fluid disposed beneath each of said bearing strip means and confined by the bottom, two sides and two ends of the groove, the fluid under each bearing being at substantially equal pressures to maintain the ends of the piston balanced, whereby the bearing strip means floats on said fluid layer to counter the force of said inlet fluid pressure means and whereby the efficiency of translation of said piston in said cylinder is thereby enhanced.

2. The power steering gear of claim 1 wherein said means comprise a single plastic strip adjacent each end of said rack, each strip substantially filling the area between the end of the rack and the end of the piston.

3. The power steering gear of claim 1 wherein said layer of hydraulic fluid is provided under operating pressure from said inlet pressure means to said groove whereby said bearing strip means float on a thin layer of said pressurized fluid to counteract the force of said inlet pressure means and further enhance the efficiency of translation of said piston in said cylinder.

4. The power steering gear of claim 3 wherein said passage means for delivering hydraulic fluid under pressure comprises longitudinal channel means formed along the surface of said piston adjacent said rack and communicating between said inlet pressure means and said recess means.

5. The power steering gear of claim 1 wherein said strip means extend around only substantially a 60° arc of said piston.

6. The power steering gear of claim 1 wherein said plastic bearing strip means is formed from a cured epoxy resin.

7. The power steering gear of claim 1 wherein said plastic bearing strip means includes substantially homogeneously dispersed metal chips to stabilize said plastic.

8. The power steering gear of claim 7 wherein said chips are ferrous metals including cast iron and steel chips.

9. The power steering gear of claim 7 wherein said chips comprise substantially one-third by volume of said filling and approximately 25-30 mesh size.

10. The power steering gear of claim 1 wherein said arcuate grooves are approximately 3/32 to 1/16 inch deep.

11. The power steering gear of claim 10 wherein said layer of hydraulic fluid is provided under operating pressure from said inlet pressure means to said groove whereby said bearing strip means float on a thin layer of said pressurized fluid to counteract the force of said inlet pressure means and further enhance the efficiency of translation of said piston in said cylinder.

12. The power steering gear of claim 11 wherein said layer of fluid is approximately 0.001 inch thick.

* * * * *